July 21, 1942.  W. W. HOPKINS  2,290,591
HOLLOW MILLING TOOL
Filed Nov. 10, 1941
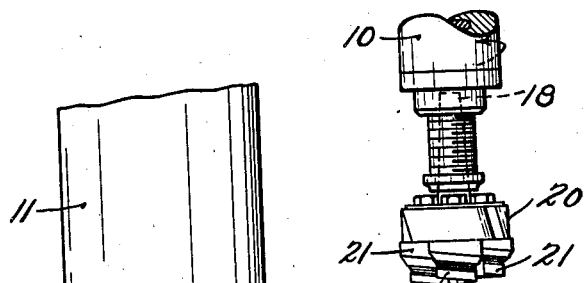
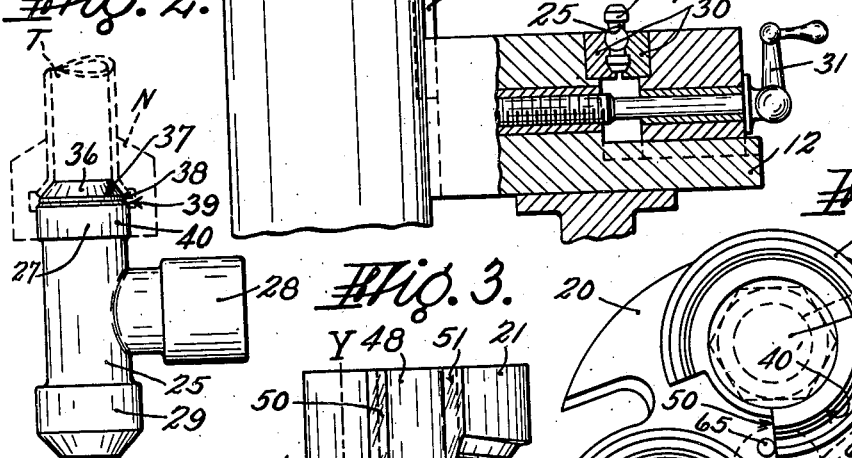
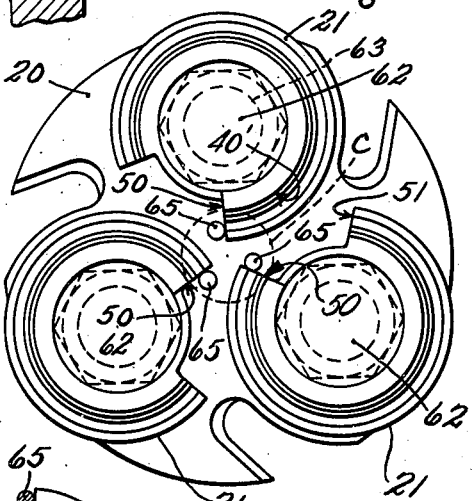
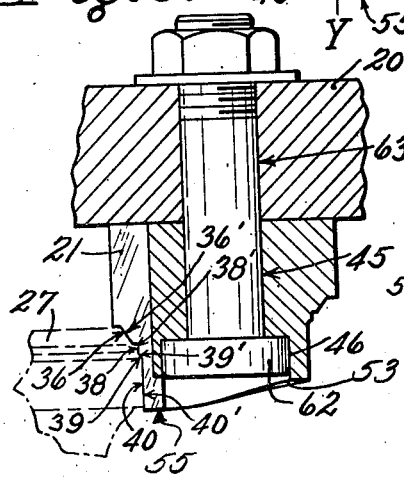
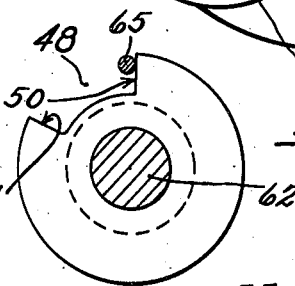
INVENTOR
WILLIAM WALTER HOPKINS
BY Clapin + Neal
ATTORNEYS Patented July 21, 1942

2,290,591

UNITED STATES PATENT OFFICE 2,290,591

HOLLOW MILLING TOOL

William Walter Hopkins, Springfield, Mass.

Application November 10, 1941, Serial No. 418,527

6 Claims. (Cl. 29—103)

This invention relates to cutting tools and in particular to a composite tool unit for use in hollow milling.

In hollow milling the tool unit consists usually of a shank having a head portion at one end with the unit adapted to be mounted by the shank for rotation around the longitudinal axis of the shank. The head portion commonly carries a plurality of cutters arranged on lines radiating from the aforementioned axis of the shank with the cutting edges of the cutters facing towards the axis. These cutters are usually similar in shape with their cutting edges spaced equally from the axis. In performing a milling operation the tool unit is rotated and a work piece, usually a generally circular piece such as bar stock, is moved into engagement with the cutters by moving the work endwise along a prolongation of the axis of the shank of the tool unit. The cutters act like a series of lathe tools and remove the desired amount of metal.

As will be understood by those skilled in the art, in simple work such as forming a cylindrical reduced portion on the end of a piece of round bar stock, the use of a hollow milling tool presents little difficulty in setting the cutters so that each does its share of the cutting. Where, however, the work to be done is of a more complicated nature such as forming a number of cylindrical reduced portions connected by frustroconical portions, the problem is more difficult. In this case, one method is to use a set of radially arranged cutters for each portion, the sets being arranged in successive planes along the axis of the tool unit. Where there are a number of reduced portions the problem of first setting up the tool unit requires a skilled machinist as each set of cutters should be adjusted relative to the axis of the tool unit so that each cutter of a given set will engage the work to the same amount and at the same time. Then after the tool has been in use and has become dulled, it requires the work of skilled help to disassemble the cutters from the tool unit, sharpen the cutters and reassemble and set up the tool unit. In particular is the problem of setting up the tool unit complicated where the work to be done is to be performed to close tolerances such as that necessary for forming precision parts such as are needed for the modern airplane work, and particularly in mass production.

In such work, the time element involved in adjusting the individual cutters during every setting up of the tool unit is important. In addition, there is a shortage of machinists having the necessary skill to do the setting up. Accordingly, one object of my invention is to provide a composite tool unit such as herein disclosed which, when once set up by a skilled machinist, can be afterwards easily disassembled, sharpened, reassembled with great accuracy and by unskilled help, throughout the life of the tool.

A further object is to provide a tool unit for the purpose described which will produce complicated work shapes with great accuracy throughout a long life of arduous use.

An additional object of my invention is to provide a tool unit in which the cutters instead of being formed of a series of sets of cutters consist of one set of form cutters arranged to cooperate to produce the desired form of work piece.

A further object is to provide a tool unit using a plurality of form cutters in which the cutters are constructed so as to permit numerous sharpening operations on the cutters while still maintaining the correct shape of cutting edge, thus insuring uniformity and a high degree of accuracy in successive work pieces.

How I attain the foregoing objects as well as further and additional objects will be clear from the following specification when read in conjunction with the accompanying drawing, in which—

Fig. 1 is a view on a reduced scale of a portion of a vertical spindle machine arranged to perform a hollow milling operation on one form of work piece and showing my tool unit mounted in working position;

Fig. 2 is a full size view of the work piece shown in Fig. 1 and illustrating a completed forming operation on one part of the piece as performed by my hollow milling tool;

Fig. 3 is an elevation of one of the cutters used in the tool unit;

Fig. 4 is a bottom view of the tool unit showing the arrangement of the cutters;

Fig. 5 is a detail view showing the manner in which each cutter is mounted in the tool unit; and Fig. 6 is a top plan view of one cutter illustrating how the cutter is ground when it is sharpened.

Any suitable machine may be used for performing the forming operation, and for the purpose of illustration I have chosen a Pratt & Whitney #2 Vertical, a machine well known in the art, a portion only of which is shown in Fig. 1. In general, this machine consists of a series of vertical tool spindles 10 each mounted for rotation on its own axis. The locus of the axes of these spindles is a circle concentric with the axis of a main supporting column 11 of the machine. This column 11 carries a group of work supports 12, one for each tool spindle with the work supports arranged radially of the column and mounted for rotation with the column, as by a key 15. Suitable automatic mechanism operating in timed relation is provided for rotating the tool spindles and for raising and lowering the work supports towards and from the tool spindles. In addition, indexing mechanism turns the column 11 and connected work supports so that each support is in turn positioned under each tool spindle at the proper time in relation to the raising and lowering of the work supports.

The tool unit consists generally of a tapered shank 18 and a head 20, the latter carrying a plurality, in this case three, of cutters 21. The unit is held in the tool spindle by engagement of the tapered shank with the usual tapered inner cylindrical surface of the tool spindle.

The work piece 25 on which the forming operation is to be performed is a drop forging for a T-connection of a fuel line for an airplane engine, see Fig. 2. In the form in which it comes from the forging room, the piece 25 is provided with roughly formed heads on each leg 27, 28, and 29 of the T. The work pieces are each supported on one of the work supports 12 by means of a vise having clamping jaws 30 which may be moved into engagement with opposite sides of the forging by means of handle 31 and which will hold one of the legs, in Fig. 1, leg 27, vertical and in alignment with the axis of the tool spindle 10. The tool spindle is caused to rotate in the direction of the arrow on the spindle, and the work is automatically raised to carry the leg 27 up into engagement with the tool unit, to thereby cut the leg 27 to the form shown in Fig. 2. The work support, when the cut is complete, automatically lowers and the column 11 is indexed in the direction of the arrow on the column which carries the next succeeding work support under the tool spindle and the cutting cycle is repeated. To completely finish the forming operation on the work piece of Fig. 2, the piece is removed from the vise on the work support and reinserted in the vise with one of the unfinished legs 28 or 29 held vertically and the forming operation repeated. As will be evident, the work piece must be hollow milled three times before the work is complete and each leg will then have the form shown for leg 27 in Fig. 2. The final product, a T for a fuel line, is drilled and threaded by other machine processes with which I am not now concerned and which I will not therefore describe.

As will be seen by reference to Fig. 2, the leg 27 on which the milling operation is complete has a complex form and includes a frustro-conical surface 36, a shoulder 37 at the end of the surface 36 and formed by a short cylindrical portion 38. Beyond this cylindrical portion there is an additional frustro-conical surface 39 and finally a cylindrical surface 40. The conical surface 36 and shoulder 37 form the seats for the flared end of a tube for a fuel line shown in dotted lines by T. The tube is held against the seats by a nut which cooperates with threads formed as a later machine operation on the cylindrical surface 40, the nut being indicated by the dotted lines N. For this particular work, it is required that the seats 36 and 37 be accurate to within three-thousandths, which is extreme accuracy for hollow milling of this type.

With a hollow milling tool of the type which had a set of blades for each surface 36, 38, 39, and 40, with the sets spaced along the axis of the tool unit, the setting up of the tool unit would require many long hours of cut and try steps by skilled mechanisms, which work is of necessity repeated every time the blades are resharpened.

Referring now to Figs. 1 and 3 to 6, I will explain how I have arranged my tool unit so that I avoid many of the disadvantages of the prior art.

Each cutter 21 is generally cylindrical in form and is provided with a central bore 45 which is enlarged at one end by a counterbore 46 for a purpose to be described. On its outer surface there is milled or otherwise formed in the cutter a groove 48, extending parallel to the bore 45 and extending inwardly towards the bore, see Fig. 6, to thereby form the substantially radial side walls 50 and 51. At its lower end, the surface 50 at its intersection with the lower face 53 of the cutter forms a primary cutting edge 55 which is radial to the axis of bore 45 and which lies in a plane preferably perpendicular to the axis. Surface 53, starting from cutting edge 55, rises in a gradual helix until it again meets the side wall 50 at 56.

On its outer surface and at the lower end of side wall 50, the cutter is peripherally grooved or formed as at 36', 38', 39', and 40', to make an outline which is complementary to that desired on the outer surface of leg 27 of the T by surfaces there shown as 36, 38, 39, and 40, see Fig. 5. The intersection of this peripheral groove and the side wall 50 forms a secondary cutting edge. This grooved portion originates at the intersection of surfaces 50, 36', 38', 39', and 40', and rises upwardly in a helix around the outer surface of the cutter until it meets side wall 51, see Fig. 3, the helix being of the same pitch as that for surface 53. Any convenient method can be used to form the surfaces 53 and 36', 38', 39', 40', such as by means of a lathe for rough cutting and grinding for the final form. An economical machine operation for grinding such surfaces as 36', 38', 39', and 40' is shown in my copending application Serial No. 443,069, filed May 15, 1942. It shows the most economical way to operate for obtaining accurate surfaces of the helical form shown. And accuracy in such surfaces is desirable to hold the cutting edge profile as each tool is sharpened during its useful life. I am now actually practicing the invention of this application with the help of that disclosed in said copending case.

As appears in Figs. 1, 4, and 5, the tool unit at the larger end of the tapered shank 18 is formed with the head 20 which is generally of cylindrical shape. The cutters 21 are secured to the head 20 by cylindrical headed bolts 62 passing through the bore 45 of each cutter and through holes 63 in the head, the bolt heads being received in the counterbore 46, as indicated in Fig. 5. These holes 63 have their centers arranged eccentric to the axis of the tapered shank 18 and at equal distances therefrom and lie parallel to this axis.

Also mounted eccentric to and equally spaced from the central axis of the unit are three stop pins 65 and when the tool is to be used, each cutter 21 is turned so that its wall 50 abuts one of the pins. The location of pins 65 is such that with the cutters adjusted against the pins, if the head, as viewed in Fig. 4, is turned counterclockwise through a complete revolution, for each cutter the shape defined by the secondary cutting edge formed by the intersection of side wall 50 and the irregular surface 36', 38', 39', and 40' is that of the finished leg 27 of Fig. 2. In addition, since these pins 65 are spaced an equal distance from the axis of the head, the surface of revolution described by each cutter during turning of the head is concentric with that described by the other cutters. That is, each point on the secondary edge of a given cutter lies on a circle that has its center on the axis of the head 20 and which passes through similar points on the remaining cutters. When the tool unit is arranged as shown in Fig. 1 and the automatic machine placed in operation each cutter acts as follows: The primary cutting edge formed by the intersection of surfaces 50 and 53 reduces the outside diameter of the forged leg 27, 28, or 29, while the secondary cutting edge, formed by the intersection of the irregular surface 36', 38', 39', and 40', and wall 50, acts as a form cutter to give the exact form to the final hollow milled piece.

In the case of the primary cutter, because of the helical shape of surface 53, it will be clear that there is clearance or rake back of the edge. In the case of the secondary cutting edge, because each of the cutting tools has its axis parallel to the axis of the tool unit but eccentrically mounted thereon, the portion of the irregular surface 36', 38', 39', and 40' which is back of the intersection of this surface with surface 50 rises away from the surface of the work piece and this provides a rake for the secondary cutting edge. This will be plain from Fig. 4 where the dotted circle C is shown representing surface 40 of the finished work and it can be seen that with each cutter the complementary surface 40' on the cutter rises away from the circle C.

It will be understood that the location of holes 63 and of the stop pins 65 must be accurately determined by an expert machinist so that when the cutters are mounted as described, all the cutters will do work on the work piece and at the same time. However, once this is accomplished, resharpening of the tool becomes the work of a relatively unskilled helper and can be rapidly performed. The reason for this will be plain from a reference to Fig. 6. In this view, surface 50 of one cutter is shown against a stop pin 65. When the cutting edges formed by the intersection of this surface with surface 53 and with irregular surface 36', 38', 39', and 40' become dulled, sharpening is performed as follows: Each cutter is removed from the tool unit and the surface 50 ground back a given distance so that it then lies, let us say, along the line Y—Y in Fig. 3. The new surface 50 will preferably be ground substantially radial to the axis of the bore 45 of the cutter and each cutter will be ground back the same amount, an easy operation on a modern grinder. Referring to Fig. 3, the effect is to move surface 50 to the location Y—Y which of course is further around the helix. Because each cutter is ground back the same amount, the change in location of the cutting edge in each cutter will be the same and because both the surface 53 and irregular surface 36', 38', 39', and 40' are cut on the same helix, the new cutting edge will have the same outline as the old edge. Then when the cutters are reinserted in the head 20 and each cutter is turned so that its newly ground surface 50 abuts one of the pins 65 all the cutters will be accurately positioned and ready for the hollow milling operation. This procedure will bring all the newly sharpened cutting edges in identical relation and position, point for point, as they were in the composite tool when the work first started.

Also, once a sample head having the correct location of holes 63 and stop pins 65 is constructed by a skilled mechanic it can be easily duplicated by relatively unskilled labor and, since the cutters because of their configuration are easily made by machine process, the tool unit can be easily and inexpensively duplicated, and when set up as shown in Fig. 4 will have the desired degree of accuracy.

As was pointed out in the description of the purposes of the invention and as will be clear from the foregoing description, there are numerous advantages to be obtained from the use of my invention for hollow milling such as extreme accuracy, ease of sharpening and resetting the tool, as well as others that need no reiteration. These advantages are not due solely to any one element of my invention such as the use of a form cutter, but are due rather to the combination of elements which has been fully disclosed and is included in the following claims.

What I claim is:

1. A composite tool unit for use in hollow milling and comprising a substantially cylindrical head portion mounted coaxially with the shank portion, a plurality of cylindrical cutters supported on the head along their longitudinal axis and eccentrically to the axis of the head, each of said cutters including a primary cutting edge and a secondary cutting edge, the primary cutting edge being formed by the intersection of an end face of the cutter with a planar cutter surface whose plane is substantially radial to the cutter supporting axis, and the secondary cutting edge being formed by the intersection of a peripheral groove and said planar cutting surface, said peripheral groove having uniform cross-section throughout its length and both the groove and the end face extending away from their intersection with the planar surface in helixes of common pitch and whose axis is concentric with the longitudinal axis of the cutter.

2. A composite tool unit for use in hollow milling and comprising a substantially cylindrical head portion, a plurality of substantially cylindrical cutters supported on the head along their longitudinal axes and eccentrically to the axis of the head, each of the cutters including a planar cutter surface whose plane is substantially radial to the cutter axis, a plurality of angularly related peripheral cutter surfaces intersecting said planar surface to form therewith a cutting edge, each of said angular surfaces extending away from said cutting edge in a helix whose axis is concentric with the axis of the cutter, each of said helixes having a common pitch, said peripheral cutter surfaces having the same angular relation throughout their length.

3. A composite tool unit for use in hollow milling and comprising a substantially cylindrical head portion, a plurality of cylindrical cutters supported on the head along their longitudinal axes and eccentrically to the axis of the head, each of said cutters including a planar cutter surface whose plane is substantially radial to the cutter axis, a plurality of angularly related peripheral cutter surfaces intersecting said planar surface to form therewith a cutting edge, said peripheral surfaces having the same angular relation throughout their length, and abutments on said head, one for each cutter and in abutting relation with the planar cutter surface, said abutments being positioned to hold each of the cutters with every point of the cutting edge tangent to a circle having as its center the axis of the head and passing through similarly located points on the cutting edge of the remaining cutters.

4. A composite tool unit for use in hollow milling and comprising a substantially cylindrical head portion, a plurality of cylindrical cutters supported on the head along their longitudinal axes and eccentrically to the axis of the head, each of said cutters including a planar cutter surface whose plane is substantially radial to the cutter axis, a plurality of angularly related peripheral cutter surfaces intersecting said planar surface to form therewith a cutting edge, each of said angular surfaces extending away from said cutting edge in a helix whose axis is concentric with the axis of the cutter, each of said helixes having a common pitch, said peripheral cutter surfaces having the same angular relation throughout their length, and abutments on said head, one for each cutter and in abutting relation with the planar cutter surface, said abutments being positioned to hold each of the cutters with every point of the cutting edge tangent to a circle having as its center the axis of the head and passing through similarly located points on the cutting edge of the remaining cutters.

5. In combination, a plurality of identical cutters, each cutter consisting of a cylindrical block having a preformed cutting edge comprising the intersection of a planar cutter surface and helical concentric bands of different diameters but of the same pitch arranged peripherally of the cylindrical block, each block having a flat base lying in a plane at right angles to the axis of said helical bands, a rotatable tool holder for use in hollow mill boring, means to clamp the cutters with their bases in a common plane lying at right angles to the axis of rotation of the tool holder and with all points on the cutting edge of each cutter arranged eccentrically to said last-named axis and at the same distance from a given point on the axis as corresponding points on the cutting edge of the other cutters, and tool setting means or stops on the tool holder to hold the cutters arranged as described, whereby when the cutters are once properly mounted in the relation stated they can be remounted in the identical relation without skill provided only that in any tool sharpening operation the same amount of metal is ground off each said planar cutter surface which forms the cutting edge of each said cutter.

6. A composite tool unit for use in hollow milling and comprising a head portion, a plurality of cutters carried on the head and each comprising a cylindrical block having means to fasten it on the head portion on an axis parallel to the axis of the head, each of said cutter axes being spaced a like distance from the axis of the head when the cutters are fastened thereon, a first and inwardly directed groove formed in the cylindrical surface of each cutter and extending parallel to its axis and intersecting one end face, at least one of the side walls of said groove extending substantially radially to the axis of the cutter to thereby form with the one end face a primary cutting edge radially positioned with relation to the axis of the cutter, said one end face from its intersection with said radial side wall extending toward the opposite end wall of the cutter in a helix and meeting said radial side wall at a point between said intersection and the opposite end wall, the cylindrical surface of the cutter adjacent said helical end wall being formed with a peripheral groove of uniform cross-section throughout its length and bounded at one side by a longitudinal edge of said helical end face, the intersection of the peripheral groove and radial side wall of the first groove forming a secondary cutting edge, abutments on said head, one for each cutter, and in abutting relation with the radial side wall of each cutter, said abutments being positioned to hold each of the cutters with every point of its secondary cutting edge tangent to a circle having as its center the central axis of the head and passing through similarly located points on the secondary cutting edge of the remaining cutters.

WILLIAM WALTER HOPKINS.